Oct. 13, 1931.  T. M. SPINKS  1,827,047
COATING IMPLEMENT
Filed Nov. 1, 1930
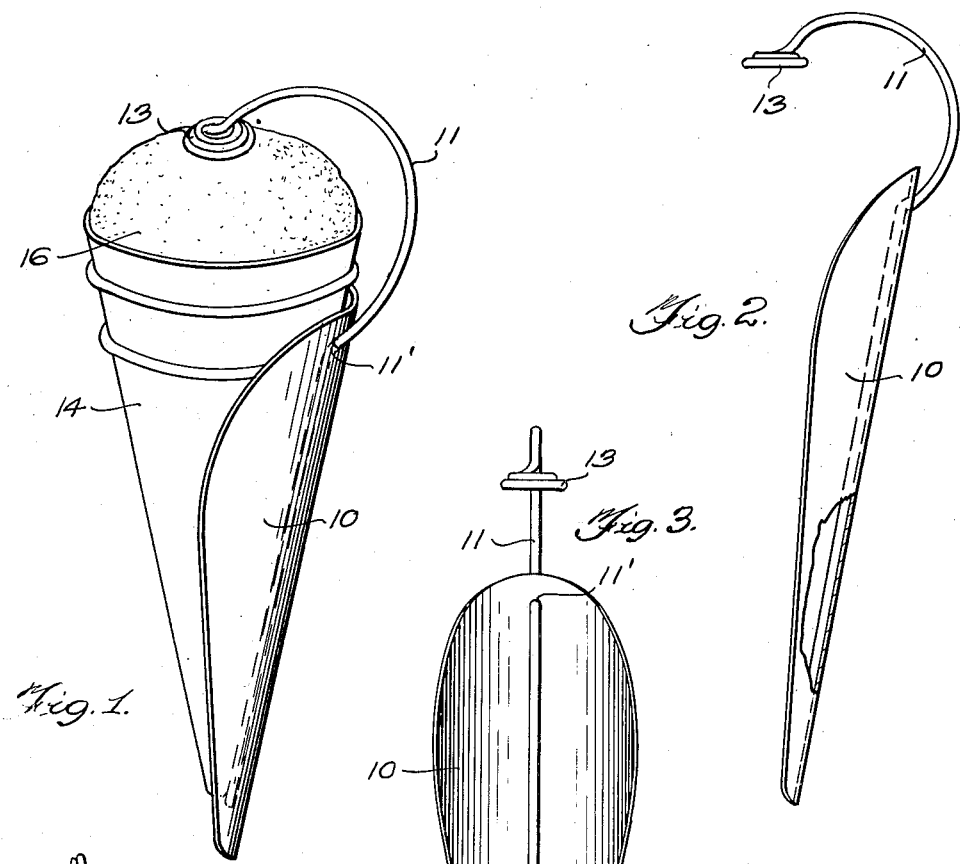
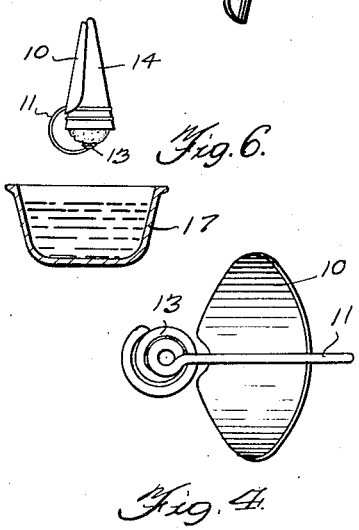
INVENTOR.
T. M. SPINKS,
BY B. P. Fulbourne
ATTORNEY.

Patented Oct. 13, 1931

1,827,047

UNITED STATES PATENT OFFICE

THOMAS M. SPINKS, OF SHUBUTA, MISSISSIPPI

COATING IMPLEMENT

Application filed November 1, 1930. Serial No. 492,810.

My invention is an edible food product, a method of producing the same, and an implement used in the practice of the method.

In according with my invention, an ice cream cone is filled with a frozen edible food product, such as ice cream, and the cone is then held by an implement which is so constructed that the ice cream filling, or the like, is retained within the cone when the cone is inverted as the large end of the cone containing the ice cream is dipped into a coating mass, such as chocolate syrup. Upon the removal of the cone from the chocolate syrup, it will be found that the ice cream filling and the upper end of the cone are both covered by the chocolate coating composition, which may be of the usual composition which is adapted to readily harden. The chocolate coating is in the form of an integral or continuous sheet or coating, and not only serves to improve the taste of the product, but serves to attach or anchor the ice cream filling within the cone. This is an important feature, as is well known, children frequently drop the ice cream filling from the cone, while eating the same.

In the accompanying drawings, forming a part of this specification, and in which like numerals are used to designate like parts throughout the same:

Fig. 1 is a side elevation of an implement embodying my invention, showing the same engaging a filled cone.

Fig. 2 is a side elevation of the implement, removed from the cone.

Fig. 3 is a front elevation of the implement.

Fig. 4 is a plan view of the same.

Fig. 5 is a side elevation of the filled food product, parts in section.

Fig. 6 is a diagrammatic view illustrating a step in the method of coating the filled cone.

The implement is shown as embodying a cone-receiving and engaging body portion 10, which is, preferably, in the form of a plate, which is longitudinally tapered, and transversely curved, for providing a concave surface corresponding to and receiving the side of the cone. The numeral 11 designates a filling holding element, which may be in the form of a rod, attached to the body portion 10 by any suitable means. For the purpose of illustration, this rod is shown as passed through an aperture 11', of the body portion 10, and extending longitudinally upon the concave inner side of the body portion, with its lower end attached to the body portion by solder 12, or the like. The filling holding element 11 is curved or bent, so that it overhangs the concave side of the body portion 10, and is, preferably, provided at its free end with a head 13. The arrangement is such that when the cone 14, containing a filling 16, such as ice cream, is held within the body portion 10, the head 13 will engage, generally, the central portion of the top of the filling.

In the practice of the method for producing the coated edible food product, the ice cream cone 14, which is of the usual edible type, receives, in its large end, the edible filling 16, such as ice cream, and the body portion 10 of the implement is applied to the cone 14, and the head 13 brought into engagement with the top of the filling 16, as clearly shown in Fig. 1. A bowl 17, or the like, containing a chocolate coating composition, which may be heated to retain the same fluid or plastic, is provided. The cone held in the implement may now be inverted without liability of the filling 16 falling therefrom, and the filling and the large end of the cone dipped or submerged into the chocolate coating, and then removed therefrom. This chocolate coating composition is, preferably, of the type which will harden quickly. Upon the removal of the large end of the cone and filling, from the chocolate coated composition, it will be found that a chocolate coating 18 is provided, which will readily harden. This chocolate coating extends over the filling 16, and the upper end portion of the cone, and being in the form of a continuous or integral coating, serves to anchor or attach the chocolate coating to the cone. This prevents the accidental discharge of the filling 16 from the cone during subsequent handling and while the product is being eaten. It is obvious that the cone may be dipped for different distances into the chocolate coating composition, depending upon whether it is desired to coat a small portion, or the major portion, or the entire portion of the cone, with the chocolate coated composition.

I wish it further understood that I am in no way restricted to the precise construction of the implement, which is given for the purpose of illustrating one practical embodiment of the invention. It is obvious that various changes in the shape, size and arrangement of parts may be resorted to, and various materials employed, for its construction.

Having thus described my invention, what I claim is:

1. An implement for holding the filling within an ice cream cone, comprising a body portion to engage with the side of the cone, and a filling engaging and holding element carried by the body portion.

2. An implement for holding the filling within an ice cream cone, comprising a body portion for engaging the side of an ice cream cone, and a filling engaging element carried by the body portion and extending laterally with relation thereto.

3. An implement for holding the filling within an ice cream cone, comprising a body portion having a recess to receive the side of an ice cream cone, said body portion extending throughout the major portion of the length of said cone, and a filling engaging element carried by the body portion and extending laterally beyond the same, in the direction of the recess to overhang such recess.

4. An implement for holding the filling within an ice cream cone, comprising a body portion which is transversely curved and longitudinally tapered for providing a recess corresponding, generally, in shape and size to the cone for receiving the same, and a filling holding element attached to the body portion and extending over the large end of the same and overhanging the recess to engage with the filling.

5. An implement of the character described, comprising a part to be held in engagement with an edible cone, and a second part carried by the first part and arranged to engage with the filling within the cone.

In testimony whereof I affix my signature.

THOMAS M. SPINKS.